United States Patent
Bodum

(10) Patent No.: US 9,370,274 B2
(45) Date of Patent: Jun. 21, 2016

(54) DISTRIBUTING HEAD FOR A BEVERAGE MAKER

(75) Inventor: Jorgen Bodum, Meggen (CH)

(73) Assignee: PI-DESIGN AG, Triengen (CH)

( * ) Notice: Subject to any disclaimer, the term of this patent is extended or adjusted under 35 U.S.C. 154(b) by 228 days.

(21) Appl. No.: 14/232,682

(22) PCT Filed: Nov. 17, 2011

(86) PCT No.: PCT/CH2011/000275
§ 371 (c)(1),
(2), (4) Date: Jan. 14, 2014

(87) PCT Pub. No.: WO2012/024810
PCT Pub. Date: Mar. 1, 2012

(65) Prior Publication Data
US 2014/0123860 A1    May 8, 2014

(30) Foreign Application Priority Data
Jul. 21, 2011 (CH) ...................................... 1230/11

(51) Int. Cl.
| A47J 31/057 | (2006.01) |
| B05B 1/28 | (2006.01) |
| A47J 31/46 | (2006.01) |
| A47J 31/06 | (2006.01) |

(52) U.S. Cl.
CPC ............... *A47J 31/46* (2013.01); *A47J 31/0631* (2013.01)

(58) Field of Classification Search
CPC ......... B05B 1/18; A47J 31/0631; A47J 31/46
USPC ............. 99/300, 304–312; 222/566; 239/104, 239/108, 533.1, 533.13, 533.14, 548, 558, 239/587.1, 602
See application file for complete search history.

(56) References Cited

U.S. PATENT DOCUMENTS

| 4,354,427 | A | 10/1982 | Filipowicz et al. |
| 5,228,625 | A | 7/1993 | Grassberger |
| 6,244,162 | B1 | 6/2001 | Dahmen |
| 6,755,119 | B1 | 6/2004 | Lyall et al. |
| 8,967,497 | B2 * | 3/2015 | Luettgen ............... B05B 1/1636 137/625.46 |
| 2006/0261190 | A1 | 11/2006 | Grant et al. |
| 2011/0094393 | A1 | 4/2011 | Clark et al. |

FOREIGN PATENT DOCUMENTS

| EP | 0 443 538 A1 | 8/1991 |
| IE | 2006/0105 S | 2/2006 |
| WO | 03/092456 A1 | 11/2003 |

OTHER PUBLICATIONS

International Preliminary Report on Patentability issued in corresponding PCT/CH2011/000275 dated Jan. 30, 2014.

* cited by examiner

*Primary Examiner* — Dana Ross
*Assistant Examiner* — Lindsey C. Teaters
(74) *Attorney, Agent, or Firm* — Sughrue Mion, PLLC

(57) ABSTRACT

The invention relates to a distributing head, which is used to distribute a hot liquid over an infusion material in a beverage maker. The distributing head has a housing (1, 2, 3, 4), which has an interior (7) and an inlet (13) for the liquid that opens into the interior (7) and a plurality of outlet openings (35), which lead outward from the interior (7). The housing (1, 2, 3, 4) has at least one first portion (1, 2), which is made of a first material, and at least one second portion (3, 4), which is made of a second material that repels liquid better than the first material.

15 Claims, 4 Drawing Sheets

DISTRIBUTING HEAD FOR A BEVERAGE MAKER

CROSS REFERENCE TO RELATED APPLICATIONS

This application is a National Stage of International Application No. PCT/CH2011/000275 filed Nov. 17, 2011, claiming priority based on Switzerland Patent Application No. 01230/11, filed Jul. 21, 2011, the contents of all of which are incorporated herein by reference in their entirety.

TECHNICAL FIELD

The present invention relates to a distributing head for distributing a hot liquid over an infusion material in a beverage maker. Distributing heads of such a type are often used particularly in coffee makers in which the coffee powder held in a filter is doused with hot water during the preparation of the coffee.

PRIOR ART

Coffee makers in which the coffee is prepared using ground coffee held in a filter and brewed with hot water have been known for a long time. The water for this purpose is heated in a known manner in a flow heater. From said flow heater, the water then rises up usually via a vertical pipe and reaches an upper, horizontal pipe. This horizontal pipe ends above the filter. From there, the hot water drips through one or more exit openings onto the coffee powder held in the filter. The water trickles through the coffee powder and in doing so releases the aroma substances from said coffee powder. The filter here serves to let the prepared coffee beverage pass through in the downward direction and to retain the depleted coffee powder. From the filter, the prepared coffee beverage finally drips into a container which is located below the filter and which is usually a cup or a coffee pot.

The same principle is also often used for the preparation of other beverages, for example tea.

Instead of coffee powder, a correspondingly different infusion material, so tea leaves in the case of tea, is then put into the filter.

So that the aroma substances can be released from the infusion material as completely as possible by the hot water, it is aimed for in beverage makers of such a type that the water drips in as spatially uniform a manner as possible onto the infusion material held in the filter. For this purpose, distributing heads which fan out the water flow at the end of the horizontal pipe above the filter are known. By way of example, a distributing head of such a type is disclosed in document U.S. Pat. No. 4,354,427. The distributing head presented therein forms a distribution chamber for the inflowing water, from which distribution chamber the water drips down onto the coffee powder through a multiplicity of exit openings. A further such distributing head is described in U.S. Pat. No. 6,244,162.

A problem with beverage makers of such a type is that dirt particles and deposits of minerals contained in the water, such as in particular lime, often accumulate along the inner faces of the pipes and lines. These deposits are particularly problematic in the region of the often narrow exit openings of the distributing head. The hot water in this region often has a comparatively slow flow rate, while at the same time it makes contact with many inner faces of the beverage maker. In addition, after use of the beverage maker, water residues often remain there, leading to further deposits being formed. Moreover, on account of their usually small diameter, the exit openings can be rapidly clogged by the dirt particles or closed by the deposits, which, in some circumstances, can considerably compromise the functionality of the beverage maker.

In order to avoid deposits of such a type, U.S. Pat. No. 6,755,119 proposes to use a polyetherimide material having a deep surface porosity for the distributing head. However, this considerably limits the choice of materials for the distributing head. It is moreover proposed to design the exit openings as tubular structures which in each case extend upward from a surface which lies in between then. Distributing heads for beverage makers which can be taken apart in a simple manner for cleaning purposes are described in WO 03/092456 and IE 060105. However, the fundamental problem, namely the formation of deposits in the first place, is not solved thereby.

SUMMARY OF THE INVENTION

It is thus an object of the present invention to specify a distributing head for a beverage maker in which deposits of dirt and lime are avoided, in particular in the region of the exit openings, or the formation of said deposits is at least slowed down.

All indications of locations and directions used in the following, such as top, bottom, horizontal, vertical, upward, downward, etc. are in each case to be understood in relation to the direction of gravity for a distributing head used as intended in a beverage maker. It is usually the case then that the distributing head is located with its exit openings directly above the infusion material.

The present invention thus provides a distributing head for distributing a hot liquid over an infusion material in a beverage maker, having:
  a housing with an interior space, with an inlet which is intended for the liquid and leads into the interior space and with a multiplicity of exit openings which lead from the interior space to the outside.

The housing here has at least one first portion which is made from a first material and at least one second portion which is made from a second material which, in comparison with the first material, is more liquid-repellent.

A liquid-repellent material is to be understood to mean a material which is not readily wettable by a liquid. Water thus very easily runs off the surfaces of materials of such a type. The second material is more liquid-repellent than the first material in particular when the contact angle of the same liquid is greater on the second material than on the first material. Preferably, the contact angle of the liquid on the second material here is greater than 90°. The second material may then be described as being hydrophobic.

The infusion material may be in particular coffee powder or tea leaves. The hot liquid used is usually water. The interior space of the housing usually serves to hold and guide the hot liquid, which, in said interior space, flows along a main flow direction from the inlet to the exit openings. The interior space of the distributing head here, excluding the inlet and exit openings, is preferably closable toward the outside in relation to the liquid, particularly preferably closable in a liquid-tight manner.

The provision of a second portion which, in comparison with the first portion, is made from a material which is more liquid-repellent leads to the creation of deposits in the housing, at least in the region of the second portion, being avoided or at least considerably reduced. The second portion is thus particularly preferably in each case located on those spots of the distributing head which are particularly prone to deposits or where deposits have a particularly negative effect on the functioning of the distributing head. Preferably, the second portion is thus located in the form of a lining on the inner side, that is that side of the housing which faces toward the interior space.

Preferably, the second material is designed to be softer than the first material. The second material typically has a Shore A hardness of 40 to 80, in particular 50 to 70. In contrast thereto, the first material has a preferred Shore A hardness of more than 80, particularly preferably of even more than 90. The second material is preferably a rubber-like material, particularly preferably silicone.

The surfaces of the second portion may be polished, roughened or untreated. However, they are preferably polished, particularly preferably even polished to a high gloss. The hydrophobic properties of the surfaces can be improved in this manner. On account of this, the formation of deposits on the surfaces of the second portion is avoided or at least slowed down. Moreover, any lime deposits can be very easily wiped away, for example with a cloth.

It is also the case that the surfaces of the second portion in particular can be treated, and have for example a correspondingly microstructured and/or nanostructured surface, so that they achieve a Lotus effect.

Particularly preferably, the second portion is located at least in the region of the exit openings. The second portion is thus preferably located in that region which in each case extends between the different exit openings and immediately adjoins those. Moreover, the second portion is particularly preferably located in such a manner that it in each case forms the inner faces of the exit openings so that the liquid, when passing through the exit openings, makes contact exclusively with the second portion. Preferably, the exit openings are located within a perforated plate. At least one side of this perforated plate, which preferably represents part of the first portion, is coated preferably with the aforementioned second material, which particularly preferably extends into the holes of the perforated plate.

The exit openings in each case preferably have an internal diameter of such a type that a droplet formation is facilitated when the liquid exits from the exit openings. In specific terms, an internal diameter of the exit openings of less than 4 mm, in particular of 1 to 3 mm, is preferred. In the event that the second material in each case reaches into the holes of a perforated plate of the first portion, the second material there in each case preferably has a radial thickness of 0.5 to 1 mm, in particular of 0.6 to 0.8 mm. The radial thickness here extends in each case in the plane of the internal diameter of the exit openings, that is to say perpendicularly to the inner surface of the exit openings.

Preferably, the second portion is located in the entire region of the interior space. Particularly preferably, the second portion covers all surfaces of the first portion which face toward the interior space. Moreover preferably, all inner-side faces of further elements which delimit the interior space, such as for example closure elements, are likewise made from the second material. In other words, the second portion thus preferably forms all liquid-carrying surfaces of the distributing head. On account of this, deposits of dirt and lime can be avoided or reduced in the entire interior space.

The first and the second portions of the housing in each case may be designed in one or more parts. In a particularly preferred embodiment, the second portion is moulded onto the first part. In this event, the first portion thus preferably forms a basic housing structure, which is advantageously overmoulded with the second material on the inner side, at least in the region of the exit openings. In contrast to this, however, embodiments are also conceivable in which the second portion forms the basic housing structure, which is supported and kept in shape by the first portion.

Preferably adjoining the exit openings, the interior space forms a distribution chamber for distributing the liquid. The distribution chamber here may serve in particular to distribute the liquid over a comparatively large area. Moreover, the housing advantageously may have a perforated plate, within which the exit openings are located and from which preferably a substantially encircling side wall extends along a main axis. In this case, the distribution chamber is delimited by the perforated plate and the side wall. Based on a usually slow and non-laminar flow of water in the interior of the distribution chamber, the inner faces of the perforated plate and of the side wall, which face toward the distribution chamber, are normally particularly prone to deposits. The second portion is, therefore, preferably located in such a manner that it forms said inner faces in full in each case. The first portion of the housing is, therefore, preferably completely covered by the second material in the region of the distribution chamber.

In the event that the interior space has a distribution chamber of such a type for distributing the liquid, the housing preferably has an inlet duct which, at a mouth opening, leads into the distribution chamber. The inlet duct here may define in particular the main flow direction of the liquid in the interior space. The inlet for the liquid into the inner space is advantageously formed in a region of the inlet duct which is located opposite to the mouth opening. This inlet is advantageously configured as a connector which particularly advantageously extends substantially in the same direction as the main axis of the side wall of the distribution chamber. The connector is preferably designed for connecting to a riser of the beverage maker.

Advantageously, the inlet duct is located in an inclined manner in relation to a direction which is perpendicular to the main axis of the side wall of the distribution chamber. When the distributing head is inserted as intended into the beverage maker, the inlet duct is thus advantageously inclined toward the direction of the distribution chamber in a downward manner in relation to the direction of gravity. On account of this, the liquid runs downward in the direction of the distribution chamber and cannot remain in the inlet duct or even flow back to the inlet of the distributing head.

The perforated plate preferably has a planar first surface, which faces toward the distribution chamber and which is formed by the first portion, and a planar second surface, which faces toward the distribution chamber and which is formed by the second portion. Here, the first and the second surfaces preferably extend in two directions which are inclined in relation to one another. Here the second portion, particularly in the region of the exit openings, may have a thickness which preferably continuously decreases as the distance from the mouth opening of the inlet duct increases. This decreasing thickness of the second portion may, in particular, serve so that the liquid, after entering into the distribution chamber, continues to flow within said distribution chamber on account of gravity and also reaches those exit openings which, in comparison with the other exit openings, are located furthest away from the mouth opening of the inlet duct. This avoids the situation where the largest part of the liquid flows only through the exit openings which are located closest to the mouth opening of the inlet duct. The liquid can thus be more uniformly distributed in the distribution chamber.

The distributing head advantageously has one or more closure elements which are releasably attached on the housing in order to close said housing toward the outside. Access to the interior space, for example for cleaning purposes, is thus made possible. In the event that the interior space forms a distribution chamber, at least said interior chamber is advantageously accessible from the outside by means of a closure element which is releasable from the housing.

The distributing head may have flow elements which are located in the region of the exit openings and project into the interior space in order to distribute the hot liquid. Such flow elements, which are preferably located in the distribution chamber if the distributing head has one, may in particular serve for routing the liquid in as uniform amounts as possible to the exit openings. This makes it possible to avoid the situation where, during use of the beverage maker, overall larger amounts of liquid flow through certain exit openings than through others, which would have the consequence that water is sprinkled in a non-uniform manner on the infusion material. Preferably, the flow elements in each case are formed exclusively by the second portion. Preferably, the flow elements are moreover located in a mirror-symmetrical manner, the plane of symmetry preferably extending along the main flow direction of the liquid in the interior space. The flow elements in each case may in particular have substantially the shape of a wedge, the tip of said wedge pointing in that direction from which the liquid flows toward the flow element according to the main flow direction in the respective region in each case. The wedge here is preferably formed from two legs which between them enclose an angle of preferably 45° to 90°, particularly preferably of approximately 70°. The two legs here may be designed to have different lengths in each case in their longitudinal direction, in particular when the flow element in each case is located at a distance from the aforementioned plane of symmetry. Preferably, the leg which in each case here is located closer to the plane of symmetry is designed to be shorter. The flow elements which are located directly on the plane of symmetry, however, in each case preferably have the shape of a wedge with two legs of equal length. Preferably, the flow elements in each case extend over the entire height of the interior space.

The first portion of the housing may be designed in particular in one piece. However, for example in order to facilitate attachment of the second portion during manufacturing, when said second portion is designed as a lining, said first portion may have a main part and also a cover which is attachable on the main part. After manufacturing, the main part and the cover can then be connected to one another in a permanent manner, for example by means of ultrasonic welding. The cover here may form, for example, an upper part of the inlet duct.

BRIEF DESCRIPTION OF THE DRAWINGS

Preferred embodiments of the invention are described in the following by means of the drawings, which serve merely for explanatory purposes and are not be interpreted as being limiting. In the drawings.

DESCRIPTION OF PREFERRED EMBODIMENTS

FIGS. 1 to 9 show various illustrations of a preferred embodiment of a distributing head according to the invention. The distributing head serves to distribute a hot liquid over an infusion material in a beverage maker. In such a beverage container, the infusion material, which may be, for example, coffee powder or tea leaves, is held in a filter and is doused with hot water from above via the distributing head. The prepared coffee beverage flows through the filter, which usually tapers from top to bottom, and from there drips into a cup or a coffee pot located below the filter. The depleted coffee powder here is retained by the filter. The distributing head here particularly serves to sprinkle the hot water in as spatially uniform a manner as possible over the infusion material, such that the aroma substances can be released from the infusion material by the water in an optimal manner.

Figure 1:
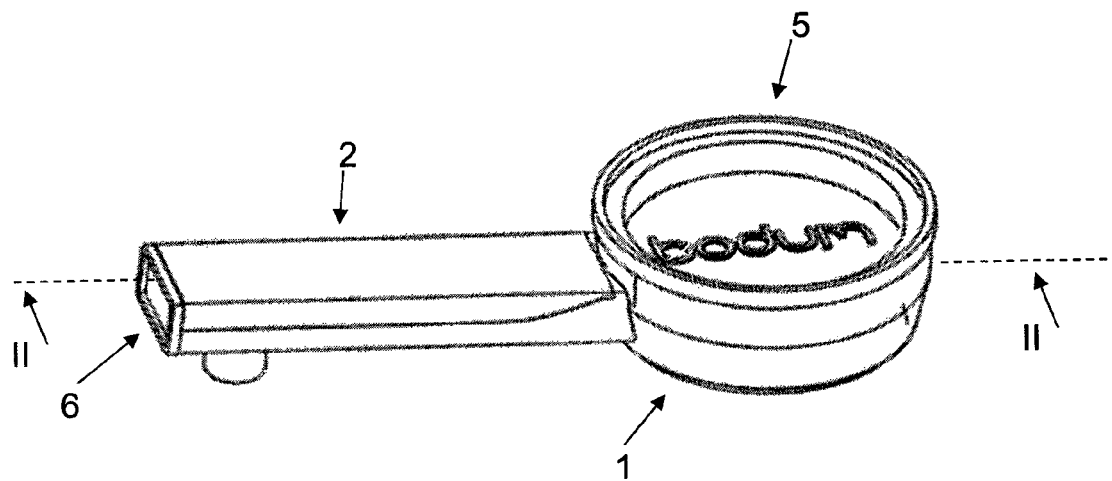
FIG. 1 shows a perspective view of a distributing head according to one embodiment of the invention.

As shown in FIG. 1, in the present embodiment the distributing head has a housing 1, 2, 3, 4, which is formed by a first portion and a second portion. The first portion is formed by a main housing part 1 and a housing cover 2, the second portion is formed by silicone linings 3 and 4. In the present embodiment, the silicone linings 3 and 4 in each case are moulded onto the main housing part 1 and the housing cover 2 of the housing 1, 2, 3, 4. The basic shape of the housing 1, 2, 3, 4 here is thus predetermined substantially by the main housing part 1 and the housing cover 2. The housing 1, 2, 3, 4 forms an interior space 7 which serves to guide the hot liquid. Moreover, the housing 1, 2, 3, 4 in the present exemplary embodiment is closable by two closure elements in the form of a closure cover 5 and a closure plug 6. In the present exemplary embodiment, the interior space 7 is thus delimited jointly by the silicone linings 3 and 4 and also by the closure cover 5 and the closure plug 6.

The silicone linings 3 and 4 are preferably each made from a material which is more liquid-repellent than the material of the main housing part 1 and the housing cover 2. The material of the silicone linings 3 and 4 preferably has a Shore A hardness of approx. 40 to 80, and the material of the main housing part 1 and the housing cover 2 preferably has a Shore A hardness of more than 80. Moreover, the surfaces of the silicone linings 3 and 4 in each case are preferably polished.

Figure 6:
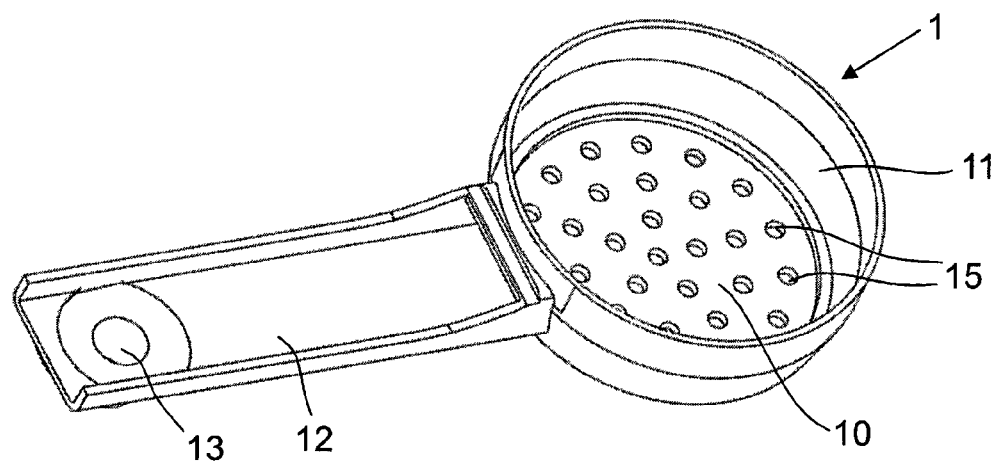
FIG. 6 shows a perspective view of the main housing part of the distributing head of FIG. 1 without a silicone lining.
Figure 7:
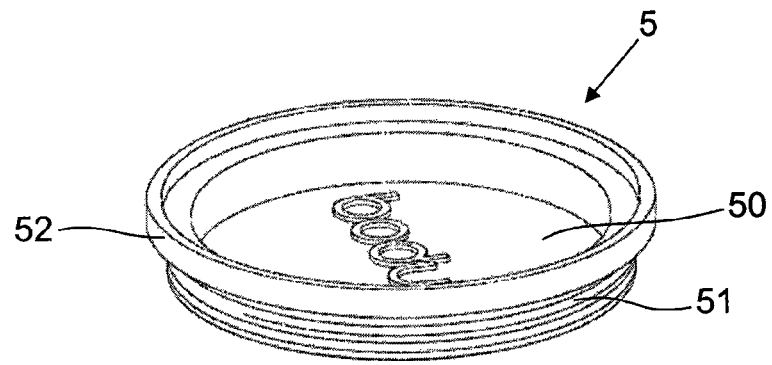
FIG. 7 shows a perspective view of the closure cover of the distributing head of FIG. 1.
Figure 8:
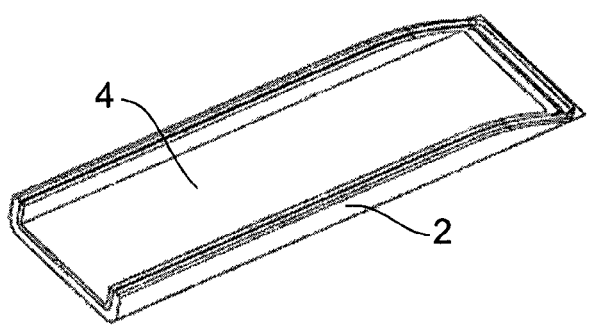
FIG. 8 shows a perspective view of the housing cover of the distributing head of FIG. 1.

The main housing part 1, which can be seen to good effect in particular in FIG. 6, has a sprinkling element in the form of a perforated plate 10 for distributing the hot liquid over the coffee powder. The perforated plate 10, which here is circular and formed substantially in a planar manner, extends perpendicularly to the direction of gravity when the distributing head is installed as intended in a beverage maker. A multiplicity of holes 15 are formed within the perforated plate 10, said holes being distributed in a preferably uniform manner over the perforated plate 10. The holes 15 allow an exit of the hot water from the interior space 7 of the housing 1, 2, 3, 4 to the outside. In the present exemplary embodiment, said holes 15 are lined with the silicone lining 3 such that exit openings 35 are formed. The exit openings 35 here in each case have an internal diameter d which is dimensioned so that the hot water falls, preferably in the form of drops, from the outside of the exit openings 35 onto the infusion material held in the filter below the distributing head. The spatial arrangement of the holes 15 or the exit openings 35 moreover allows water to be sprinkled in as uniform a manner as possible on the infusion material.

Preferably an encircling side wall 11 extends upward along the peripheral circumference of the perforated plate 10. The transition from the perforated plate 10 to the side wall 11 here may, as in this case, take place via an encircling step. It is also possible for the side wall 11 to have a slightly conical shape which widens from the bottom upward to approximately halfway up its height and, at its upper end, merges via a slight bend into an almost cylindrical shape of the side wall 11. The perforated plate 10 and the side wall jointly define a distribution chamber 70, which serves to distribute the hot water, in the interior space 7.

In the vicinity of the perforated plate 10, a rectangular recess 14, which extends over approximately half the height of the side wall 11 and over an angular region of somewhat less than 45°, is formed in the side wall 11.

The main housing part 1 in the present exemplary embodiment additionally has an inlet duct 12, which with its front end leads into the recess 14 of the side wall 11. The opposite, rear end of the inlet duct 12 is designed to be open to the outside but is closable by means of the closure plug 6. Toward the top, the inlet duct 12 is designed to be open over substantially its entire length and is closable by means of the housing cover 2. From the base of the inlet duct 12, two side walls lying opposite one another extend upward. As can be seen in particular in FIG. 2, the side walls of the inlet duct 12 in each case have a constant height over a large part of the length of the inlet duct 12, said height being somewhat greater than half of the height of the recess 14. However, in the vicinity of the recess 14, the side walls of the inlet duct 12 rise in relation to the base until they terminate slightly above the recess 14 on the side wall 11. Above the recess 14, the side walls of the inlet duct 12 are connected to one another via a flange which projects from the side wall 11.

In the vicinity of the rear end, which can be closed with a closure plug 6, an entry connector 13 extends from the base of the inlet duct 12 in the downward direction. The entry connector 13 here extends downward from the base of the inlet duct 12 to about level with the perforated plate 10. With its upper end, the entry connector 13 leads into the inlet duct 12 and thus forms an inlet for the liquid into the interior space 7. On account of a slight inclination of the inlet duct 12 in the longitudinal direction, this upper end of the entry connector 13 is located slightly above the recess 14 in relation to the direction of gravity. This has the effect that, having passed through the entry connector 13 from below, the water flows toward the perforated plate 10 on account of the effect of gravity in the inlet duct 12. The inlet duct 12 defines a main flow direction of the hot water in the interior space 7 of the distributing head, said main flow direction extending along the longitudinal direction of the inlet duct 12.

Toward the top, the inlet duct 12 is closable by means of the housing cover 2. The housing cover 2 has a shape which is complementary to the inlet duct 12, on account of which the inlet duct 12, which is closed by the housing cover 2, has a cross section which is of rectangular shape. Preferably, the housing cover 2 is connected to the inlet duct 12 during manufacturing, in particular by means of ultrasonic welding, in such a manner that it permanently closes the inlet duct 12. The provision of a housing cover 2 serves in particular to ensure accessibility to all inner faces of the housing 1 from the outside during manufacturing.

The main housing part 1 and also the housing cover 2 are preferably each made in one piece from a plastic, in particular from a polycarbonate. In principle, however, it would also be conceivable, of course, to form the housing cover 2 directly in one piece with the main housing part 1.

Silicone linings 3 and 4 are attached on the main housing part 1 and on the housing cover 2, respectively. In the present exemplary embodiment, these silicone linings 3 and 4 cover all inner faces of the main housing part 1 and the housing cover 2 and are preferably moulded onto the main housing part 1 and onto the housing cover 2, respectively. The silicone lining 3, in consequence, has a substantially identical configuration to that of the main housing part 1. In an analogous manner to the main housing part 1, said silicone lining 3 correspondingly has a perforated plate 30, with exit openings 35, a side wall 31, which upward from the perforated plate 30 and has a recess 34, and an inlet duct 32, which leads into the recess 34 and has an entry connector 33. Likewise, the silicone lining 4 has a substantially identical configuration to that of the housing cover 2, on which said silicone lining 4 is attached.

Figure 2:
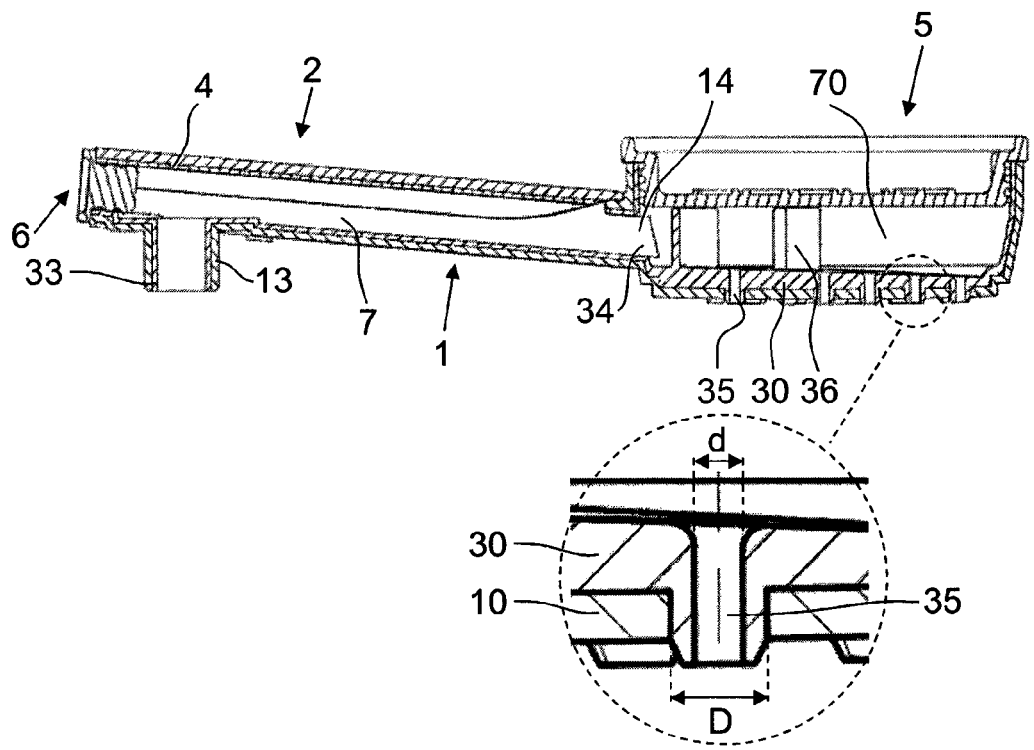
FIG. 2 shows a central sectional view of the distributing head of FIG. 1 along the line II-II.
Figure 3:
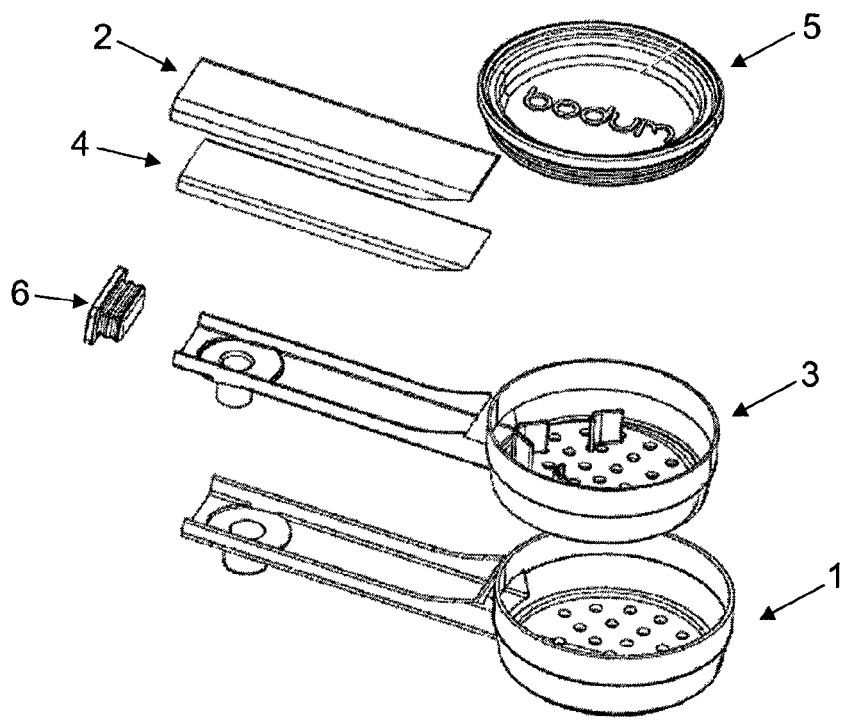
FIG. 3 shows a perspective exploded view of the distributing head of FIG. 1.

As can be seen in FIG. 2, the silicone lining 3 in each case covers the radial inner faces of the holes 15 of the perforated plate 10 on the inner side. The silicone lining 3 here thus extends in each case into the holes 15, such that the inner faces of the exit openings 35 in each case are formed by the silicone lining 3. The holes 15 here have an internal diameter D, and the exit openings 35 of the silicone lining have an internal diameter d. The internal diameter d is dimensioned so as to be smaller than the internal diameter D. Here, d is in each case dimensioned in such a manner that a droplet formation is facilitated when the hot water exits from the exit openings 35. In specific terms, in the present exemplary embodiment an internal diameter d of the exit openings 35 of approx. 2.3 mm has been selected for this purpose. The radial thickness of the silicone lining 3 within the holes 15, which corresponds to the difference between the internal diameters D and d, is approx. 0.6 to 0.8 mm.

Whereas the silicone linings 3 and 4 have a constant thickness of approx. 1 to 2 mm in the region of the side wall 31, the inlet duct 32 and the entry connector 33, the perforated plate 30 of the silicone lining 4 has a varying thickness in relation to the direction of gravity of between approx. 1 to 2 mm and 4 to 5 mm. As is readily visible in FIG. 2, the perforated plate 30 here is formed to be thickest in the vicinity of the recess 34 and becomes thinner as the distance from the recess 34 increases, such that said perforated plate 30 forms a planar surface which is slightly inclined in relation to the direction of gravity. This slight inclination of the upper side of the perforated plate 30 has the effect that the water flowing in from the inlet duct 32 does not remain on the perforated plate 30 in the region close to the recess 34 and flow away almost exclusively via the exit openings 35 which are located in this region, but flows onward over the perforated plate 30 and also reaches the exit openings 35 which are located at a distance from the recess 34. As a result, the water is distributed over the perforated plate 30 in an improved manner and exits from the various exit openings 35 in more uniform amounts.

Figure 4:
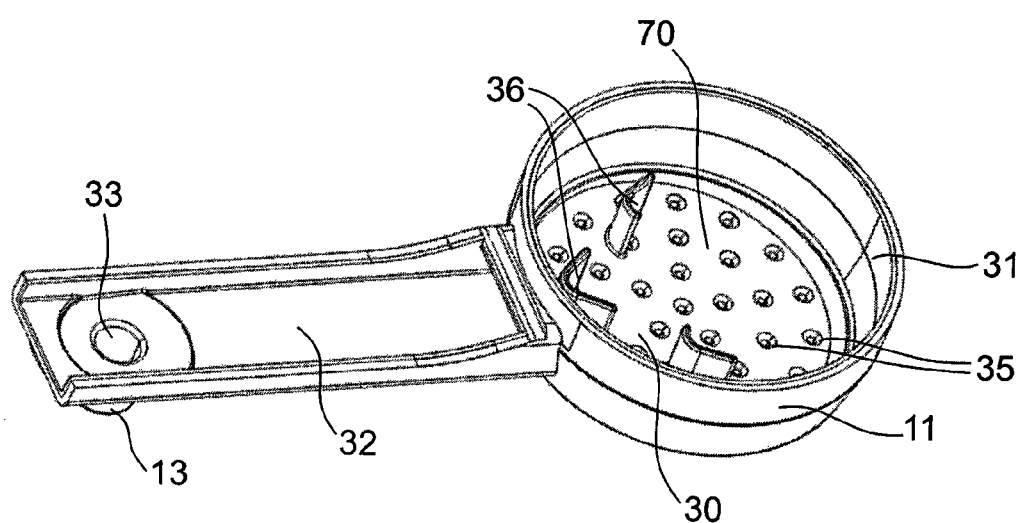
FIG. 4 shows a perspective view of the main housing part of the distributing head of FIG. 1.
Figure 5:
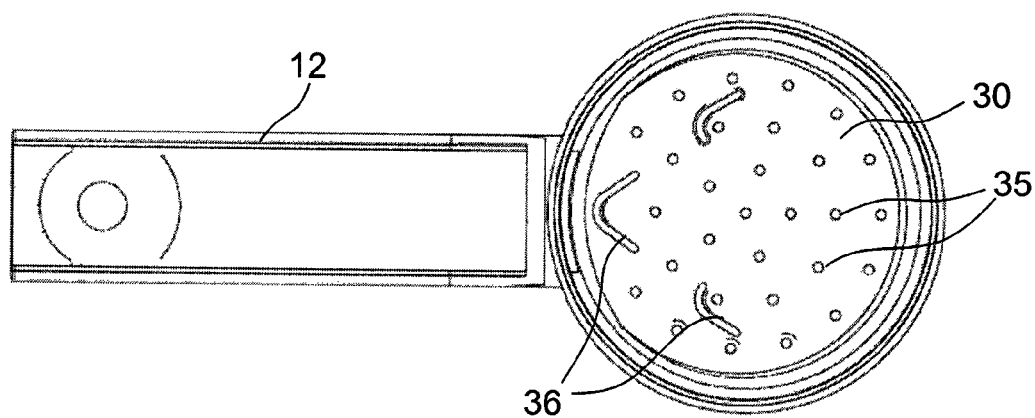
FIG. 5 shows a plan view onto the main housing part of the distributing head of FIG. 1.

Flow elements 36, which extend upward into the distribution chamber 70 and are readily visible particularly in FIGS. 4 and 5, are formed on the upper side of the perforated plate 30. The flow elements 36 here are attached directly on the perforated plate 30. In other embodiments, said flow elements 36, however, could also be attached on the closure cover 5, for example. The flow elements 36 serve to split up the flow of water in the distribution chamber 70 and to distribute the hot water perpendicularly to the main flow direction in a more uniform manner over the perforated plate 30, such that said hot water exits from the various exit openings 35 in more uniform amounts. In the present case, exactly three flow elements 36 are in place. The flow elements 36 here in the plan view of FIG. 5 in each case have substantially the shape of a wedge which is slightly rounded at the front, the tip of said wedge facing in the direction counter to the main flow direction. This wedge here has two legs which in each case enclose an angle of approx. 70°. One of the flow elements 36 here is located in the immediate vicinity of the recess 34. In relation to a plane of symmetry which extends along the longitudinal axis of the inlet duct 32, the flow elements 36 have a mirror-symmetrical arrangement. The two legs of the flow elements 36, which are each spaced apart laterally from the longitudinal axis of the inlet duct 32, are designed here to be of different lengths, the leg located closer to the plane of symmetry in each case being markedly shorter. The height of the flow elements 36 corresponds approximately to that of the recess 34.

The distribution chamber 70 is closable from above by a closure cover 5 which is insertable in a releasable manner into the upper opening of the housing 1, said opening being defined by the side wall 11. The closure cover 5, which is preferably made in one piece from silicone and which is shown, in particular, in FIG. 7, has a closure face 50, a side wall 51, which extends upward from said closure face 50 in an encircling manner, and a bearing flange 52, which extends outward from the upper edge of the side wall 51. Sealing ribs which allow a liquid-tight connection to the side wall of the silicone lining 3 are formed on the radial outer side of the side wall 51. The bearing flange 52 serves for bearing on the upper edge of the side wall 11 of the housing 1. Once the closure cover 5 has been inserted into the housing 1, the closure face 50 preferably lies against the flow elements 36.

Figure 9:
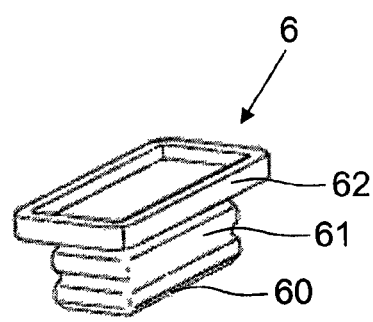
FIG. 9 shows a perspective view of the closure plug of the distributing head of FIG. 1.

The rear end of the inlect duct 12 in the present embodiment is closable in a liquid-tight manner by means of a closure plug 6. The closure plug 6 is insertable in a releasable manner into the inlet duct 12 and is preferably made in one piece from silicone. As can be seen in FIG. 9, said closure plug 6 has a rectangular closure face 60 with an encircling side wall 61, from which a bearing flange 62 extends outward. The side wall 61 on its outer side has sealing ribs which allow a connection to the inner face of the inlet duct 32. The bearing flange 62 serves for bearing on the rear edge of the inlet duct 12, once the closure plug 6 has been fully inserted into the inlet duct 12.

The invention is, of course, not limited to the present exemplary embodiment, and a large number of modifications are possible. By way of example, it is not absolutely necessary for the silicone linings 3 and 4 to form all liquid-carrying inner faces of the distributing head. It suffices if, for example, one silicone lining is attached in particular in the region of the holes 15, that is to say within the holes 15 and/or on the inner side of the perforated plate 10. Moreover, the lining need not be made from silicone, but may be made from another material which is more liquid-repellent in comparison with the main housing part 1. The flow elements 36, the closure plug 6 and the closure cover 5 in each case may be configured in any other manner or may even be dispensed with altogether. The presence of an inlet duct is also not absolutely necessary. Instead of being on an inlet duct, the inlet for the water into the distributing head could, for example, also be located directly above the perforated plate. The housing cover 2 need not necessarily be present and could also be formed for example, in particular from the outset in one piece with the main housing part 1. Welding together the housing cover and the main housing part during manufacturing would then no longer be necessary. A large number of further modifications are possible.

LIST OF REFERENCE SIGNS

1 Main housing part
10 Perforated plate
11 Side wall
12 Inlet duct
13 Entry connector
14 Recess
15 Holes
2 Housing cover
3 Silicone lining
30 Perforated plate
31 Side wall
32 Inlet duct
33 Entry connector
34 Recess
35 Exit openings
36 Flow elements
4 Silicone lining
5 Closure cover
50 Closure face
51 Side wall
52 Bearing flange
6 Closure plug
60 Closure face
61 Side wall
62 Bearing flange
7 Interior space
70 Distribution chamber

The invention claimed is:

1. A distributing head for distributing a hot liquid over an infusion material in a beverage maker, having
   a housing with a perforated plate and a substantially encircling side wall which extends from the perforated plate along a main axis, with an interior space arranged on an inner side of the housing, and with an inlet which is intended for the liquid and leads into the interior space, wherein the interior space forms a distribution chamber which is intended for distributing the liquid and is delimited by the perforated plate and the side wall, the perforated plate and the side wall having inner faces which face toward the distribution chamber, and wherein the perforated plate comprises a multiplicity of exit openings which lead from the interior space to the outside,
   wherein the housing has at least one first portion which is made from a first material and at least one second portion which is made from a second material which, in comparison with the first material, is more liquid-repellent, and
   wherein the second portion is a lining which is located on the inner side at least in the region of the exit openings in such a manner that it forms the inner faces of the perforated plate and the side wall in full.

2. The distributing head as claimed in claim 1, wherein the second portion is located in the entire region of the interior space.

3. The distributing head as claimed in claim 1, wherein the second material is silicone.

4. The distributing head as claimed in claim 1, wherein the second material is designed to be softer than the first material.

5. The distributing head as claimed in claim 4, wherein the second material has a Shore A hardness of less than 80 and the first material preferably has a Shore A hardness of more than 80.

6. The distributing head as claimed in claim 1, wherein the second portion is moulded onto the first portion.

7. The distributing head as claimed in claim 1, wherein the exit openings have a radial inner face which is formed from the second material.

8. The distributing head as claimed in claim 1, wherein the housing additionally has an inlet duct which leads into the distribution chamber and which is located in an inclined manner in relation to a direction which is perpendicular to the main axis.

9. The distributing head as claimed in claim 1, wherein the perforated plate has a planar first surface, which faces toward the distribution chamber and which is formed by the first portion, and a planar second surface, which faces toward the distribution chamber and which is formed by the second portion, and wherein the first and the second surfaces extend in two directions which are inclined in relation to one another.

10. The distributing head as claimed in claim 1, having at least one closure element which is releasably attached on the housing in order to close said housing toward the outside.

11. The distributing head as claimed in claim 1, which has flow elements which are located in the region of the exit openings and project into the interior space in order to distribute the hot liquid.

12. The distributing head as claimed in claim 11, wherein the flow elements are formed exclusively by the second portion.

13. A beverage maker having
a filter for holding an infusion material; and
a distributing head, which is located above the filter and is intended for distributing a hot liquid over the infusion material, and which has a housing with a perforated plate and a substantially encircling side wall which extends from the perforated plate along a main axis, with an interior space arranged on an inner side of the housing, and with an inlet which is intended for the liquid and leads into the interior space, wherein the interior space forms a distribution chamber which is intended for distributing the liquid and is delimited by the perforated plate and the side wall, the perforated plate and the side wall in each case having inner faces which face toward the distribution chamber, and wherein the perforated plate comprises a multiplicity of exit openings which lead from the interior space to the outside, wherein the housing has at least one first portion which is made from a first material and at least one second portion which is made from a second material which, in comparison with the first material, is more liquid-repellent, and wherein the second portion is a lining which is located on the inner side at least in the region of the exit openings in such a manner that it forms the inner faces of the perforated plate and the side wall in full in each case.

14. A distributing head for distributing a hot liquid over an infusion material in a beverage maker, having
a housing with an interior space arranged on an inner side of the housing, with an inlet which is intended for the liquid and leads into the interior space multiplicity of exit openings which lead from the interior space to the outside,
wherein the housing has at least one first portion which is made from a first material and at least one second portion which is made from a second material which, in comparison with the first material, is more liquid-repellent,
wherein the second portion is a lining which is located on the inner side at least in the region of the exit openings, and
wherein the distributing head has flow elements which are located in the region of the exit openings and project into the interior space in order to distribute the hot liquid, the flow elements being formed exclusively by the second portion.

15. A beverage maker having
a filter for holding an infusion material; and
a distributing head, which is located above the filter and is intended for distributing a hot liquid over the infusion material, and which has a housing with an interior space arranged on an inner side of the housing, with an inlet which is intended for the liquid and leads into the interior space and with a multiplicity of exit openings which lead from the interior space to the outside, wherein the housing has at least one first portion which is made from a first material and at least one second portion which is made from a second material which, in comparison with the first material, is more liquid-repellent, wherein the second portion is a lining which is located on the inner side at least in the region of the exit openings, and wherein the distributing head has flow elements which are located in the region of the exit openings and project into the interior space in order to distribute the hot liquid, the flow elements being formed exclusively by the second portion.

* * * * *